United States Patent Office 3,751,338
Patented Aug. 7, 1973

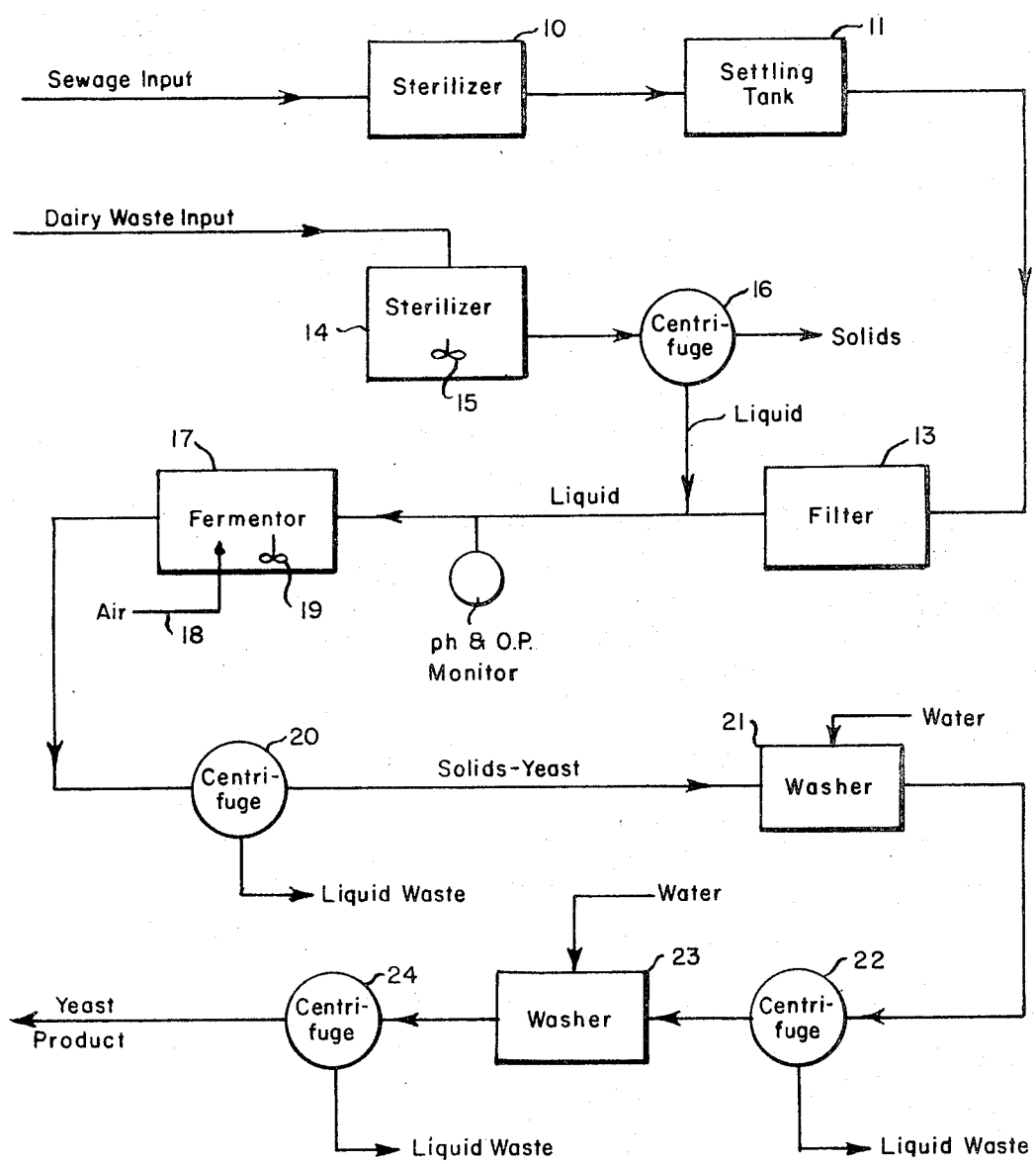

3,751,338
PROCESS FOR PRODUCING YEAST
Kenneth Barton Farris, 1057 Morewood Ave.,
Pittsburgh, Pa. 15213
Filed May 3, 1971, Ser. No. 139,736
Int. Cl. C12c 11/00
U.S. Cl. 195—82                                2 Claims

ABSTRACT OF THE DISCLOSURE

The specification discloses a process for the production of yeast utilizing as a growth medium for yeast organisms, a non-chlorinated, sterilized and filtered sewage effluent, in which the pH is in the range 5.0 to 8.0 and the osmotic pressure is in the range .05 M to 1.5 M NaCl. Fermentation of yeast species *Saccharomyces cerevisiae* and *Candida utilis* individually or in combination, and of yeast species *Endomycopsis fibuliger* in combination with either one or both of the aforesaid species is conducted under aerobic conditions at a temperature in the range of 20° to 35° C. for a period of from 12 to 30 hours. Centrifugation of the fermented liquid separates out the solid yeast particles from liquid waste. Repetitive washing and centrifugation provides for purification of the final end product.

---

The present invention relates to a process for producing yeast as an incident to sewage treatment.

Various known methods have been proposed and utilized for the production of yeast to be used as an animal feed supplement, in fertilizers, and for human consumption. Examples of such methods are described in U.S. Pat. No. 2,322,320, issued June 22, 1943, to Alfred S. Schultz, Lawrence Atkin and Charles N. Frey, and U.S. Pat. No. 3,186,922 issued June 1, 1965, to Alfred Champagnat. Yeast of the species *Saccharomyces cerevisiae* and *Candida utilis* are known to be of high nutritional value being rich in essential amino acids and having a high protein content. Both of these species are already used for human consumption.

In view of the lack of cycling of American wastes and the consequent danger this presents to world ecology, it is desirable that a medium be provided which is also the waste of another process.

It is accordingly the object of this invention to provide an inexpensive readily available growth medium utilizable for the production of yeast.

More specifically, it is the object of the invention to provide a process for the production of yeast utilizing as a growth medium untreated or primary treated sewage.

The process comprising the invention will be described hereinafter in connection with the accompanying drawing, wherein:

The figure is a diagrammatic view depicting the successive steps in carrying out the proposed process.

Referring to the drawing, it will be seen that the process is initiated by supplying primary treated sewage from which any chlorine remaining from chlorination has had time to be evaporated or sewage which has undergone the primary treatment process up to but not including chlorination, to a sterilizer 10. It will be understood that if the process is initiated with untreated sewage, then the customary steps for primary treatment of sewage up to but not including chlorination must be taken prior to supply to the sterilizer 10.

Since chemical sterilization will prevent the growth of yeast, sterilization must be accomplished by application of heat to heat the liquid sewage to 130° C. at a pressure sufficient to prevent boiling of the liquid. The sterilization temperature of 130° C. must be maintained for a period of time such as 90 to 120 minutes. Subsequent stages in the process must be carried on under sterile conditions in order to prevent contamination.

The sterilized liquid sewage is conducted to a settling tank 11 where the sewage is allowed to settle for the time required to separate 50% or more of the liquid in the sewage. The actual length of time allowed for the settling stage will vary, of course, with the capacity of the tank and season of the year, but preferably should not exceed twelve hours unless the tank capacity is exceedingly great. If the sludge does not settle rapidly enough, an accelerator such as an organically degradable, non-toxic flocculating agent may be added aseptically to the settling tank. Waste solids are removed from the tank at the conclusion of the settling period following removal of the liquid to the succeeding stage, namely the filtration unit 13.

Filtration unit 13 may be any one of three types, namely:

(a) A rapid sand filter similar to that used in purification of water for human consumption;

(b) A rapid sand filter as in (a) followed by filtration through filter paper. In this case the filter paper should be a continuous sheet which is continuously rotated, the liquid being forced through at one point and the residue scraped off at another point; and (c) A continuous flow centrifuge which would be limited to use in smaller plants.

The liquid leaving the filtration unit 13 should be clear with no solid particulate. If the liquid is not clear after passage through the unit 13, it should be re-filtered through the same unit or a separate similar unit because otherwise, as will later appear, this particulate will remain and contaminate the yeast separated out in a subsequent stage.

Following the filtration stage, whey or other dairy liquid waste may now be added to the sewage liquid. It will be understood that prior to addition to the sewage liquid, the dairy liquid waste must be sterilized in a sterilizer 14, similar to sterilizer 10. The dairy liquid must be kept in motion as by an agitator 15 to prevent denatured protein, which precipitates out of solution, from building up. The dairy liquid must, in addition, be centrifuged in a continuous flow centrifuge 16 to remove all the denatured protein and make it perfectly clear with no particulate. The solids removed from the dairy liquid should be saved and can be added to the yeast after the final product yeast is obtained.

The addition of the dairy liquid to the sewage liquid should be in maximum ratio of 1:1. In practice, the practical amount of dairy liquid added will depend on the availability of the dairy waste and may be omitted altogether. However, the addition of the dairy liquid will provide an increased yield of yeast.

The clear liquid sewage is now supplied to a fermenter 17, either of the continuous flow or the batch type. However, prior to entering the fermenter 17 the degree of acidity measured in terms of index of hydrogen ion concentration (pH) and osmotic pressure (O.P.) of the sewage liquid is monitored. The pH should be between 5.0 and 8.0 and the osmotic pressure in the range .05 M to 1.5 M NaCl. If the pH exceeds the maximum of the range, sterile de-ionized water may be added until the pH is restored to within the range. Alternatively, the sewage liquid may be diverted to the settling tank 11 or it may be simply stored for future addition to the sewage liquid. If the osmotic pressure is not in the range, procedures similar to that for pH may be followed. Thus, if the O.P. is too high, sterile de-ionized water can be added. If the O.P. is too low, the liquid can be stored until the monitored O.P. is too high and then added to bring the sewage liquid into appropriate range, or the sewage liquid can be diverted to the settling tank 11.

Referring to the fermenter 17, the initial fermentation should be a batch and should ferment for forty-eight hours to allow the yeast organism time to adapt and reach maximum yield. The initial inoculum should be 0.10% of the weight of the fermenting liquid. The temperature range for the fermentation is 20° to 35° C., temperatures in the lower portion of the range being preferable. Sterile air should be bubbled through the liquid in the fermenter as indicated at 18. This provides aerobic fermentation and helps to keep the liquid agitated. Agitation of the liquid in the fermenter is desirable, even necessary, to prevent build-up and growth of yeast on the walls of the fermenting vessel. If desired, a power-driven stirrer 19 may be provided in the fermenter to provide additional agitation of the liquid in the fermenter.

If the fermentation is carried on in batches, at least $1/10$ of each batch should be left in the fermenter, as an inoculum for a succeeding batch. The time allowed for fermentation, except for the initial operation, should be in the range of twelve to thirty hours, depending on the sewage and the particular plant. The organisms used as an inoculum are *Saccharomyces cerevisiae, Candida utilis* and *Endomycopsis fibuliger*. *Saccharomyces cerevisiae* and *Candida utilis* may be used separately or in combination with each other. Growing a combination of *Saccharomyces cerevisiae* and *Candida utilis* has been found to result in a high yield of yeast. Also, a combination of *Endomycopsis fibuliger* with either one or both of *Saccharomyces cerevisiae* and *Candida utilis* may be employed advantageously.

Following the period of fermentation, the liquid is then conducted to a centrifuge 20 where it is centrifuged to remove or separate the yeast. The centrifuge should operate at a speed in the range of 2,000–3,000 r.p.m. and for a period of from five to ten minutes. The liquid remaining after separation of the yeast is waste, and the yeast is the product sought.

It is desirable to wash the end product yeast obtained from the centrifuge 20 in water to insure purity. Thus, the yeast is successively washed in a suitable washer 21 and again centrifuged at a centrifuge 22. If further purity is desired an additional washing operation in water may be performed at 23 and centrifugation had at centrifuge 24 to obtain the final end product of yeast.

It will be apparent that minor variations may be made in the various steps of the process above described without departing from the basic principle involved, namely utilization of a sterilized sewage effluent as a growth medium or environment for yeast organisms. Utilization of the process described accomplishes treatment of sewage in a manner such that the by-products may be restored to the soil or to streams with no pollution effects and at the same time enables the production of a useful product, yeast, beneficial as a food or as a fertilizer.

I claim:
1. A process for production of yeast comprising the steps of:
   (a) sterilization of primary treated sewage effluent,
   (b) separation of waste solids in the effluent by a settling operation,
   (c) filtration of the effluent through a sand filter,
   (d) addition of sterilized liquid dairy waste to the effluent,
   (e) fermenting the sterile combined effluent and waste with yeast inoculum, and
   (f) centrifuging the fermented product to separate out the solid yeast particles.

2. A process for production of yeast according to claim 1, wherein the sterilized dairy waste added in Step (d) is centrifuged to provide clear liquid without particulates before addition to the effluent.

References Cited
UNITED STATES PATENTS

| | | | |
|---|---|---|---|
| 3,105,799 | 10/1963 | Tveit | 195—82 |
| 3,462,275 | 8/1969 | Bellamy | 99—9 |
| 3,195,271 | 7/1965 | Golueke et. al. | 47—1.4 |
| 3,580,840 | 5/1971 | Uridil | 210—11 |

A. LOUIS MONACELL, Primary Examiner

R. B. PENLAND, Assistant Examiner

U.S. Cl. X.R.

99—9; 210—11